(12) United States Patent
Nagayama (10) Patent No.: US 10,378,399 B2
(45) Date of Patent: Aug. 13, 2019

(54) OIL MIST SEPARATION MECHANISM OF INTERNAL COMBUSTION ENGINE

(71) Applicant: AISIN SEIKI KABUSHIKI KAISHA, Kariya-shi, Aichi-ken (JP)

(72) Inventor: Yuichi Nagayama, Aichi-ken (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 45 days.

(21) Appl. No.: 15/554,092

(22) PCT Filed: Feb. 23, 2016

(86) PCT No.: PCT/JP2016/055139
§ 371 (c)(1),
(2) Date: Aug. 28, 2017

(87) PCT Pub. No.: WO2016/143501
PCT Pub. Date: Sep. 15, 2016

(65) Prior Publication Data
US 2018/0038248 A1 Feb. 8, 2018

(30) Foreign Application Priority Data

Mar. 9, 2015 (JP) ................................ 2015-046171

(51) Int. Cl.
*F01M 9/08* (2006.01)
*F01M 13/04* (2006.01)
(Continued)

(52) U.S. Cl.
CPC ............. *F01M 13/04* (2013.01); *B01D 45/08* (2013.01); *F01M 9/08* (2013.01); *F01M 13/00* (2013.01);
(Continued)

(58) Field of Classification Search
CPC .......... F01M 13/04; F01M 9/08; F01M 13/00; F01M 2013/0055; F01M 2013/0461; B01D 45/08
(Continued)

(56) References Cited

U.S. PATENT DOCUMENTS 8,181,635 B2    5/2012  Ogawa et al.
2009/0301449 A1*  12/2009  Ogawa ................. F01M 13/022
                                                    123/574

(Continued)

FOREIGN PATENT DOCUMENTS

JP       1-173310 U    12/1989
JP       2001-182520 A  7/2001
(Continued)

OTHER PUBLICATIONS

International Search Report (PCT/ISA/210) dated May 10, 2016, by the Japanese Patent Office as the International Searching Authority for International Application No. PCT/JP2016/055139.
(Continued)

*Primary Examiner* — Lindsay M Low
*Assistant Examiner* — Yi-Kai Wang
(74) *Attorney, Agent, or Firm* — Buchanan Ingersoll & Rooney PC (57) ABSTRACT

An oil mist separation mechanism of an internal combustion engine includes an oil mist separation portion being integrally provided with an internal combustion engine main body at an outer surface thereof, the oil mist separation portion for separating an oil mist included in a blow-by gas sent from the internal combustion engine main body, and an oil returning portion being connected to the oil mist separation portion, the oil returning portion returning an oil
(Continued)

separated by the oil mist separation portion to an oil stored at a lower portion of the internal combustion engine main body.

8 Claims, 5 Drawing Sheets

(51) Int. Cl.
   *F01M 13/00* (2006.01)
   *B01D 45/08* (2006.01)
(52) U.S. Cl.
   CPC ............... *F01M 2013/0055* (2013.01); *F01M 2013/0461* (2013.01)
(58) Field of Classification Search
   USPC .................................................. 123/196 CP
   See application file for complete search history.

(56) References Cited

U.S. PATENT DOCUMENTS

2010/0101514 A1* 4/2010 Hirano ................. F01M 13/022
                                                          123/41.86
2011/0290225 A1* 12/2011 Torella ................. F01M 13/022
                                                          123/573

FOREIGN PATENT DOCUMENTS

| | | |
|---|---|---|
| JP | 2007-309157 A | 11/2007 |
| JP | 2008-202410 A | 9/2008 |
| JP | 2009-293509 A | 12/2009 |
| JP | 2010-159733 A | 7/2010 |
| JP | 2012-122370 A | 6/2012 |
| JP | 2012-127284 A | 7/2012 |

OTHER PUBLICATIONS

Written Opinion (PCT/ISA/237) dated May 10, 2016, by the Japanese Patent Office as the International Searching Authority for International Application No. PCT/JP2016/055139.

Excerpt from Honda Motor Co., Ltd.'s Service Manual, Mar. 2011, 4 pages (including pp. 6-15 and 6-16), with English translation following Japanese language text.

* cited by examiner

Second embodiment

FIG. 9

OIL MIST SEPARATION MECHANISM OF INTERNAL COMBUSTION ENGINE

TECHNICAL FIELD

An embodiment of the present invention relates to an oil mist separation mechanism of an internal combustion engine.

BACKGROUND ART

An oil mist separation mechanism of an internal combustion engine separating an oil mist included in blow-by gas is known. Such oil mist separation mechanism of the internal combustion engine is disclosed in, for example, JP2010-159733A.

In JP2010-159733A, a circulation apparatus of the internal combustion engine that circulates the oil separated from the blow-by gas into an oil pan is disclosed. Such circulation apparatus of the internal combustion engine includes an oil separator fixed to a lid portion covering an outer surface of an upper portion of a cylinder block, an oil circulation passage extending so as to be along an upper surface and a side surface of the cylinder block, and an oil drain pipe mounted on a bottom end of the oil circulation passage. Accordingly, the oil separated by the oil separator of the lid portion is returned to oil stored in the oil pan via the oil circulation passage and the oil drain pipe. Here, in the circulation device of the internal combustion engine of JP2010-159733A, the oil separator is separately provided relative to the lid portion.

DOCUMENT OF PRIOR ART

Patent Document

Patent document 1: JP2010-159733A

OVERVIEW OF INVENTION

Problem to be Solved by Invention

However, in the circulation apparatus of the internal combustion engine of JP2010-159733A, because the oil separator is separately disposed relative to the lid portion or the cylinder block, a problem of the increase of a number of components occurs. In addition, in the circulation apparatus of the internal combustion engine of JP2010-159733A, because a manufacturing process for fixing the oil separator to the lid portion is separately required, a problem of the complication of the manufacturing process occurs.

The present invention is provided to solve the aforementioned problem, and an object of the present invention is to provide an oil mist separation mechanism of an internal combustion engine which is able to inhibit an increase of the number of components and a complication of a manufacturing process.

Means for Solving Problem

To achieve the above-described object, an oil mist separation mechanism of an internal combustion engine according to an aspect of the present invention includes an oil mist separation portion being integrally provided with an internal combustion engine main body at an outer surface thereof, the oil mist separation portion for separating an oil mist included in a blow-by gas sent from the internal combustion engine main body, and an oil returning portion being connected to the oil mist separation portion, the oil returning portion returning an oil separated by the oil mist separation portion to an oil stored at a lower portion of the internal combustion engine main body.

In the oil mist separation mechanism of the internal combustion engine according to the aspect of the present invention, as described above, since the oil mist separation portion is integrally provided with the internal combustion engine main body on the outer surface thereof, the increase of the number of components and the complication of the manufacturing process may be inhibited comparing to a case where the oil mist separation portion is separately provided from, for example, the engine main body.

In the oil mist separation mechanism of the internal combustion engine according to the aspect of the present invention, favorably, the oil mist separation portion includes an oil returning hole being connected to the oil returning portion and is integrally provided with the internal combustion engine main body at an upper surface of the outer surface of the internal combustion engine main body, and the oil returning portion includes an oil returning passage having an upper end portion that is connected to the oil returning hole, the oil returning passage extending downwardly and linearly from the oil returning hole.

As configured above, since the oil returning passage extends downwardly and linearly, the oil separated in the oil mist separation portion may be securely moved downwardly at the oil returning passage by its own weight. Accordingly, the oil may be securely returned to the oil stored at the lower portion of the internal combustion engine main body. In addition, since the oil returning passage is formed to extend linearly, the oil returning passage may be easily formed.

In the oil mist separation mechanism of the internal combustion engine according to the aspect of the present invention, favorably, the oil mist separation portion is provided with a turning structure including a first blow-by gas passage portion sending the blow-by gas in a first direction, and a second blow-by gas passage portion being connected to the first blow-by gas passage portion and sending the blow-by gas in a second direction that is opposite to the first direction. Meanwhile, the first blow-by gas passage portion and the second blow-by gas passage portion correspond to broad concepts including not only a case where the first blow-by gas passage portion and the second blow-by gas passage portion linearly extend in predetermined directions (the first direction and the second direction) but also a case where the first blow-by gas passage portion and the second blow-by gas passage portion send the blow-by gas, as a whole, in the predetermined directions while meandering and turning.

As configured above, the length of the passage sending the blow-by gas may be increased while saving the space of the oil mist separation portion by the turning structure. Accordingly, the oil mist separation portion may efficiently separate the oil mist from the blow-by gas while downsizing the oil mist separation portion.

In this case, favorably, the oil mist separation portion includes an oil returning hole being connected to the oil returning portion and being provided in a vicinity of a returning portion between the first blow-by gas passage portion and the second blow-by gas passage portion, and a bottom surface portion being inclined downwardly towards the oil returning hole.

As configured above, because the oil separated at the oil mist separation portion may be easily gathered at the oil returning hole by the bottom surface portion inclined downwardly toward the oil returning hole, the separated oil may be easily returned to the oil via the oil returning portion. Because the oil returning hole is provided in the vicinity of the returning position, at least one of the first blow-by gas passage portion and the second blow-by gas passage portion may send the blow-by gas in a direction that is opposite to the flow of the oil toward the oil returning hole. Accordingly, because the oil mist included in the blow-by gas may be easily absorbed by the oil flowing in the opposite direction, the oil mist may be more efficiently separated from the blow-by gas.

In the oil mist separation mechanism of the internal combustion engine according to the aspect of the present invention, favorably, the internal combustion engine main body is configured such that a sliding direction of a piston is along with a horizontal direction, and the oil mist separation portion includes a blow-by gas inlet opening downwardly, and a partition wall being provided so as to separate a crankshaft and the blow-by gas inlet of the internal combustion engine main body from each other.

As configured above, the oil supplied to the crankshaft flies upwardly by the centrifugal force by the rotation of the crankshaft, and is inhibited from directly entering the oil mist separation portion from the blow-by gas inlet opening downwardly by the partition wall separating the crankshaft and the blow-by gas inlet from each other.

In the oil mist separation mechanism of the internal combustion engine according to the aspect of the present invention, favorably, the oil mist separation portion includes an oil returning hole being provided in a vicinity of a bottom portion of a bottom surface portion of the oil mist separation portion and being connected to the oil returning portion.

As configured above, since the liquefied oil may be easily gathered at the oil returning hole, the oil may be securely returned to the oil.

In this case, favorably, the oil returning portion includes an upper end portion that is connected to the oil returning hole and a lower end portion that is soaked in the oil; and the oil returning portion includes a diameter of a passage in which an oil is not sucked up by manifold vacuum.

As configured above, the oil stored at the lower portion of the internal combustion engine main body may be inhibited from returning to the oil mist separation portion via the oil returning portion.

In the configuration in which the oil mist separation portion is provided with the first blow-by gas passage portion and the second blow-by gas passage portion, favorably, at least one of the first blow-by gas passage portion and the second blow-by gas passage portion includes a labyrinth structure.

As configured above, the length of the passage in which the blow-by gas flows may be efficiently increased while saving space of the oil mist separation portion.

In the oil mist separation mechanism of the internal combustion engine according to the aspect of the present invention, favorably, the internal combustion engine main body is a stationary type or a movable type.

As configured above, comparing to an internal combustion engine main body mounted on, for example, a vehicle, because the mounted state (for example, inclination) of the internal combustion engine main body may be inhibited from changing in response to the driving state of the vehicle, the connection portion of the oil returning portion may be inhibited from exposing upwardly relative to the surface of the oil stored at the lower portion of the internal combustion engine main body. Accordingly, the internal combustion engine main body may be used in a state where the blow-by gas is securely inhibited from entering the oil mist separation portion via the oil returning portion.

MODE FOR CARRYING OUT THE INVENTION

[First Embodiment]
(The Configuration of an Engine)

First of all, an engine 100 according to a first embodiment of the present invention will be explained with reference to FIGS. 1 to 7. Hereinafter, an extending direction of a crankshaft 4 (see FIG. 2) corresponds to a X direction, a direction orthogonal to the crankshaft 4 corresponds to a Y direction, and an upper and lower direction corresponds to a Z direction.

Figure 1:
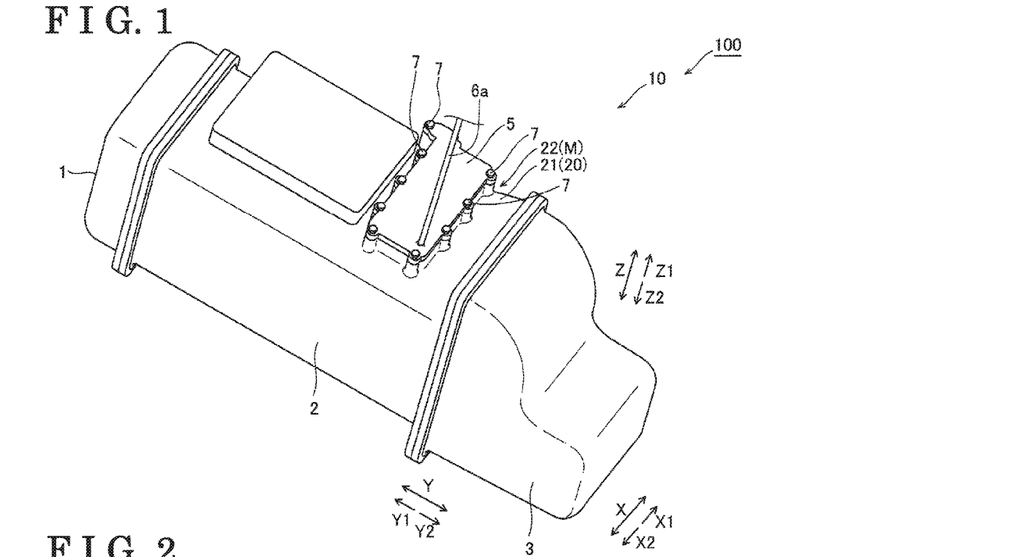
FIG. 1 is a perspective view of an engine according to a first embodiment of the present invention.
Figure 2:
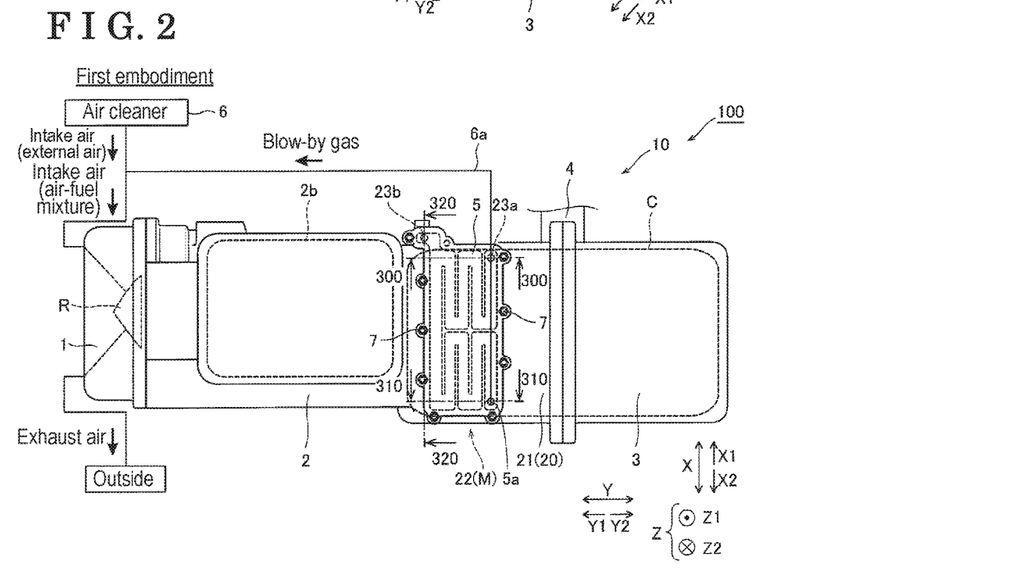
FIG. 2 is a top view of the engine according to the first embodiment of the present invention.

The engine 100 according to the first embodiment of the present invention corresponds to a stationary engine fixedly disposed, and is mainly used in a generator. As illustrated in FIGS. 1 and 2, the engine 100 includes an engine main body 10 being made of an aluminum alloy and including a cylinder head cover 1, a cylinder block 2 integrally provided with a cylinder head, and an oil pan 3. The cylinder block 2 of the engine main body 10 is configured to be molded by molding at a time. Alternatively, the cylinder block 2 may be separately provided from the cylinder head. The engine 100 and the engine main body 10 are examples of an internal combustion engine and an internal combustion engine main body of the present invention, respectively.

Figure 3:
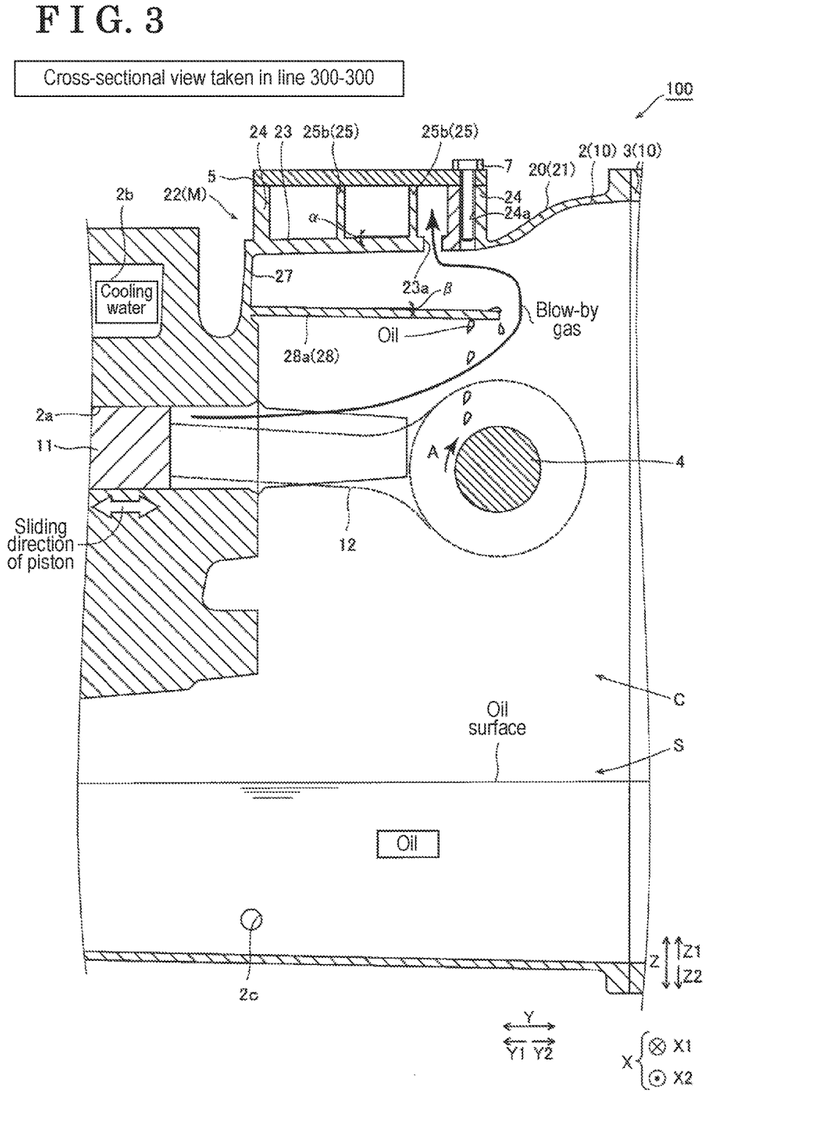
FIG. 3 is a cross sectional view taken along line 300-300 in FIG. 2.

For example, a valve mechanism (not illustrated) is disposed inside the cylinder head cover 1. It is configured such that an intake air (air-fuel mixture of an outer air, a fuel, and a blow-by gas) is introduced to a combustion chamber R of the cylinder head cover 1 from one side (X1 side) of the cylinder head cover 1, and such that an exhaust air from the combustion chamber R is exhausted from the other side (X2 side) of the cylinder head cover 1. Inside the cylinder block 2 that is connected to a rear (Y2 side) of the cylinder cover 1, as illustrated in FIG. 3, a cylinder 2a in which a piston 11 reciprocates in the Y direction of a horizontal direction orthogonal to the upper and lower direction, and a water jacket 2b surrounding the cylinder 2a while having a partition wall therebetween are formed. The water jacket 2b is configured such that a cooling water (coolant (antifreeze solution)) for cooling the cylinder 2a circulates.

A crank chamber C is formed at a rear portion of the engine main body 10 by the cylinder block 2 and the oil pan 3 connected to the rear of the cylinder block 2. In the crank chamber 3, a crank shaft 4 being connected so as to be rotatable in an A direction via the piston 11 and a connecting rod 12 is disposed. The crank shaft 4 extends along the X direction. In addition, an oil reservoir portion S storing oil is provided at a lower portion (Z2 side) of the crank chamber C. The oil in the oil reservoir portion S is pumped up from the oil reservoir portion S by an oil pump (not illustrated) and is returned to the oil reservoir portion S after lubricating sliding portions of a valve-type timing member (not illustrated) such as a camshaft and an outer circumferential surface of the piston 11.

Gas (blow-by gas) within the combustion chamber R enters into the crank chamber C via a slight clearance between the cylinder 2a and the piston 11. Here, an oil mist separation mechanism M is provided at the engine 10 for separating and returning the oil included in the blow-by gas to the oil reservoir portion S when the blow-by gas passes through the slight clearance or in the crack chamber C in a case where the blow-by gas is returned to the intake air. Accordingly, the consumption of the oil may be inhibited from increasing. In addition, the oil mist separation mechanism M includes an oil mist separation portion 22 for separating the oil mist included in the blow-by gas from the crank chamber C of the engine main body 10, and an oil returning portion 26 returning the oil separated by the oil mist separation portion 22 to the oil stored in the oil reservoir portion C at the lower portion of the engine main body 10.

[Configuration of the Oil Mist Separation Portion]

Here, in the first embodiment, as shown in FIG. 3, the oil mist separation portion 22 is integrally provided with the cylinder block 2 at an upper surface 21 of an outer surface 20 of the cylinder block 2 (the engine main body 10). The oil mist separation portion 22 is integrally molded with the cylinder block 2 when the cylinder block 2 is molded. Furthermore, the oil mist separation portion 22 is covered by a sheet metal-shaped lid 5 that is separately provided from the engine main body 5 from upward (Z1 side).

The oil mist separation portion 22 is provided at a void space of the cylinder block 2 that does not interfere with other components of, for example, the water jacket 2b. Here, in a case where an oil mist separation portion is provided at a lid, a case where the lid cannot be mounted on the cylinder block due to the interference between the oil mist separation portion of the lid and the outer surface of the cylinder block depending on the configuration change of the cylinder block may occur. In this case, the configuration of not only the lid but also the oil returning portion is required to change, and as a result, the configuration change of both of the lid and the cylinder block is required. On the other hand, according to the first embodiment, because the oil mist separation portion 22 is integrally provided with the cylinder block 2 at the void space of the cylinder block 2, only the configuration of the cylinder block 2 has to be changed without the change of the configuration of the lid 5.

Figure 4:
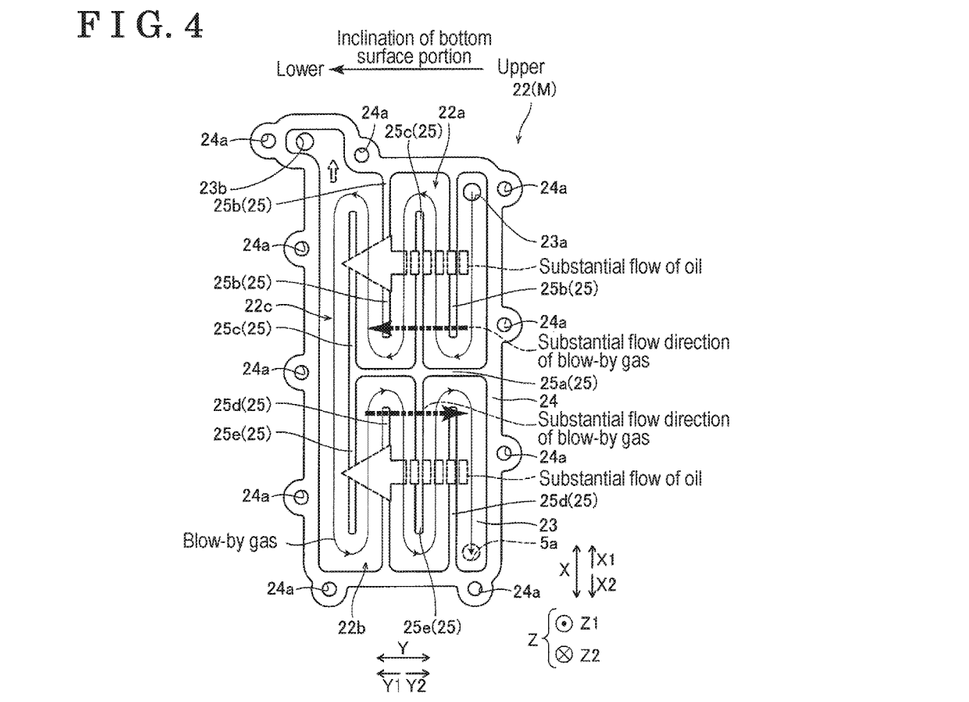
FIG. 4 is a top view illustrating an oil mist separation portion in a state where a lid is removed according to the first embodiment of the present invention.
Figure 5:
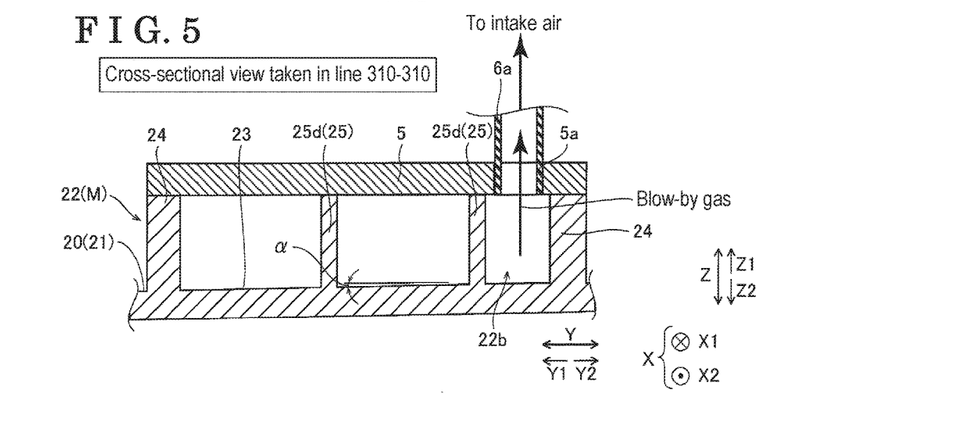
FIG. 5 is a cross sectional view of the oil mist separation portion taken along line 310-310 in FIG. 2.

As illustrated in FIGS. 4 and 5, the oil mist separation portion 22 includes a bottom surface portion 23, an outer wall portion 24 extending upward from the bottom surface portion 23 and forming an outer rim portion of the oil mist separation portion 22, and an inner wall portion 25 extending upward from the bottom surface portion 23 and forming an inner side of the outer wall potion 24. As illustrated in FIGS. 3 and 5, the bottom surface portion 23 is formed so as to be inclined downward (Z2 side) by an angle α (for example, approximately 1 or 2 degrees, see FIGS. 3 and 5) from a rear (Y2 side) towards a front (Y1 side).

A blow-by gas inlet 23a passing through (opening downwardly) the cylinder block 2 in the upper and lower direction is provided in the vicinity of a corner portion of the bottom surface portion 23 at the Y2 side and the X1 side. The blow-by gas inlet 23a is provided to introduce the blow-by gas from the crack chamber C (see FIG. 3) to the oil mist separation portion 22.

As shown in FIG. 4, an oil returning hold 23b passing through the cylinder block 2 in the upper and lower direction is provided in the vicinity of the corner portion of the bottom surface portion 23 at the Y1 side and the X1 side. The oil returning hole 23b is provided to remove the liquid oil separated from the oil mist at the oil mist separation portion 22 from the oil mist separation portion 22. In addition, because the bottom surface portion 23 is inclined downward from the Y2 side toward the Y1 side, the oil returning hole 23b is provided in the vicinity of a bottom portion of the bottom surface portion 23 of the oil mist separation portion 22.

As illustrated in FIGS. 2 and 4, a blow-by gas outlet 5a passing through (opening upwardly) the lid 5 in the upper and lower direction is provided in the vicinity of the corner portion of the lid 5 at the Y2 side and the X2 side. The blow-by gas outlet 5a is provided to remove the blow-by gas, in which the oil mist is separated, from the oil mist separation portion 22. Further, as illustrated in FIG. 5, a hose 6a is connected to the blow-by gas outlet 5a. Accordingly, it is configured such that the blow-by gas of the oil mist separation portion 22 is returned to the intake air which is after the blow-by gas of the oil mist separation portion 22 passes through an air cleaner 6 via the hole 6a. As such, because the oil mist separation portion 22 is connected to the intake air system, the inside of the oil mist separation portion 22 includes a pressure that is lower than that of the crank chamber C by manifold vacuum.

An upper end surface (an end surface of the Z side) of the outer wall portion 24 and an upper end surface of the inner wall portion 25 are formed so as to be positioned at a substantially the same height in the upper and lower direction. In addition, the upper end surface of the outer wall portion 24 and the upper end surface of the inner wall portion 25 are configured so as to be in contact with a bottom surface of the lid 5. Accordingly, a first passage portion 22a, a second passage portion 22b, and a turning passage portion 22c that will be described later are configured to be partitioned.

As illustrated in FIG. 4, the outer wall portion 24 is formed in a frame shape, and is formed in a substantially quadrilateral shape excluding the corner portion at the Y1 side and the X1 side. The outer wall portion 24 is provided with plural screw holes 24a. Accordingly, as shown in FIG. 2, the lid 5 is mounted on the oil mist separation portion 22 by plural bolts 7. The lid 5 is configured to be able to be removed upwardly from the oil mist separation portion 22 by the removal of the bolts 7. Accordingly, the maintenance such as a cleaning of an inside of the oil mist separation portion 22 may be easily performed by removing the lid 5 and confirming a state inside the oil mist separation portion 22 (for example, a state whether the oil is blocked) from upward.

As illustrated in FIG. 4, the inner wall portion 25 include a first inner wall portion 25a at a substantial center of the engine main body 10 in the X direction, the first inner wall portion 25a extending from the outer wall portion 24 at the Y2 side towards the Y1 side. Accordingly, the oil mist separation portion 22 is provided with a turning structure including the first passage portion 22a at the X1 side relative to the first inner wall portion 25a, the second passage portion 22b at the X2 side relative to the first inner wall portion 25a, and the turning passage portion 22c at the Y1 side. The first passage portion 22a and the second passage portion 22b are examples of a first blow-by gas passage portion and a second blow-by gas passage portion of the present invention, respectively.

Both the first passage portion 22a and the second passage portion 22b extend along the Y direction at Y2 side relative to the turning passage portion 22c. The turning passage portion 22c extends along the X direction so as to connect the first passage portion 22a and the second passage portion 22b in the vicinity of the outer wall portion 24 at the Y1 side. In addition, an oil returning hole 23b is provided at an end portion of the turning passage portion 22c at the X1 side.

The inner wall portion 25 includes plural (two) second inner wall portions 25b at the first passage portion 22a, the second inner wall portions 25b extending from the outer wall portion 24 at the X1 side towards the first inner wall portion 25a at the substantially the center in the X direction, and plural (two) third inner wall portions 25c at the first passage portion 22a, the third inner wall portions 25c extending from the first inner wall portion 25a towards the outer wall portion 24 at the X1 side. The second inner wall portions 25b and the third inner wall portions 25c are alternately disposed in the Y direction. As a result, the first passage portion 22a is formed in a labyrinth (maze) structure. A blow-by gas inlet 23a is provided at one end portion of the first passage portion 22a, which is formed in the labyrinth structure, at the Y2 side, and the other end portion at the Y1 side is connected to an end portion of the turning passage portion 22c at the X1 side.

Similarly, the inner wall portion 25 includes plural (two) fourth inner wall portions 25d at the second passage portion 22b, the fourth inner wall portions 25d extending from the outer wall portion 24 at the X2 side toward the first inner wall portion 25a at the substantially the center in the X direction, and plural (two) five inner wall portions 25e at the second passage portion 22b, the five inner wall portions 25c extending from the first inner wall portion 25a towards the outer wall portion 24 at the X2 side. The fourth inner wall portions 25d and the fifth inner wall portions 25e are alternately disposed in the Y direction. As a result, the second passage portion 22b is formed in the labyrinth structure. Meanwhile, a blow-by gas outlet 5a is provided at one end portion of the second passage portion 22b, which is formed in the labyrinth structure, at the Y2 side, and the other end portion at the Y1 side is connected to an end portion of the turning passage portion 22c at the X2 side.

Accordingly, the oil mist separation portion 22 extends serpiginously by the labyrinth structure and the turning structure of the first passage portion 22a and the second passage portion 22b. As a result, the fine particle oil mist may be efficiently collected and liquefied from the blow-by gas retained in an inner space of the oil mist separation portion 22. Further, in the oil mist separation portion 22, the oil mist is separated from the blow-by gas by an inertia crush relative to the outer wall portion 24 and the inner wall portion 25. By the bottom surface portion 23 inclined downward from the Y2 side towards the Y1 side, the separated liquid oil on the bottom surface portion 23 substantially flows towards the Y1 side within the first passage portion 22a and the second passage portion 22b. The oil is gathered in the oil returning hole 23b provided in the vicinity of the bottom portion of the bottom surface portion 23 of the oil mist separation portion 22.

Here, the flow of the blow-by gas in the oil mist separation portion 22 will be explained. In the oil mist separation portion 22, the blow-by gas enters from the blow-by gas inlet 23a provided at the bottom surface portion 23 at the Y2 side and the X1 side. Then, the blow-by gas flows serpiginously in the first passage portion 22a in the Y1 direction. The blow-by gas flowing to the end portion of the first passage portion 22a at the Y1 side flows in the turning passage portion 22c in the X2 direction. Then, the blow by gas flowing to the end portion of the turning passage portion 22c at the X2 side flows serpiginously in the second passage portion 22b towards the Y2 direction (opposite direction of the Y1 direction). Then, the blow-by gas is returned to the intake air via the hose 6a from the blow-by gas outlet 5a of the lid 5 provided in the vicinity of the corner portion at the Y2 side and the X2 side. The Y1 direction and the Y2 direction are examples of a first direction and a second direction of the present invention, respectively.

[The Configuration of the Oil Returning Portion]

Figure 6:
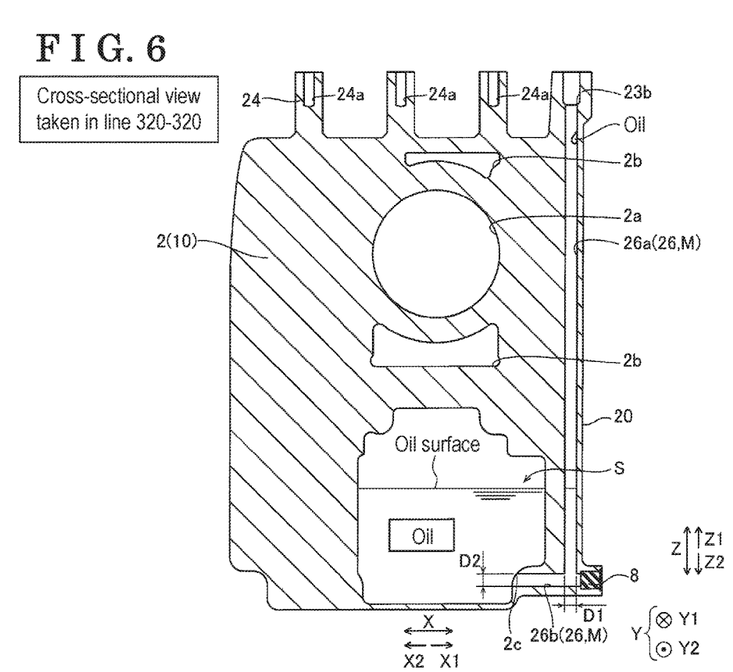
FIG. 6 is a cross sectional view of a cylinder block taken along line 320-320 in FIG. 2.

As shown in FIG. 6, an oil returning portion 26 is provided at the X1 side of the cylinder block 2 (the engine main body 10) of the engine main body 10. One end portion of the oil returning portion 26 is connected to an oil returning hole 23b of the oil mist separation portion 22, and the other end portion of the oil returning portion 26 is connected to a connection hole 2c provided lower than an oil surface of an oil reservoir portion S of the cylinder block 2. Accordingly, the oil separated by the oil mist separation portion 22 is configured to be returned to the oil stored in the oil reservoir portion S provided at the lower portion of the engine main body 10.

Here, in a case where the connection hole 2c of the oil reservoir portion S is provided upper than the oil surface, the blow-by gas may enter the oil mist separation portion 22 via the oil returning portion 26 due to the manifold vacuum. In such a case, the oil mist may not be separated sufficiently. On the other hand, in the first embodiment, because the other end portion of the oil returning portion 26 is connected to the connection hole 2c provided lower than the oil surface of the oil reservoir portion S of the cylinder block 2, the blow-by gas is securely inhibited from entering the oil mist separation portion 22 via the oil returning portion 26.

Furthermore, in the first embodiment, the oil returning portion 26 consists of a first returning passage 26a extending along the Z direction, and a second returning passage 26b extending along the X direction. The first returning passage 26a includes an upper end portion that is connected to the oil returning hole 23b and extends linearly and downwardly (Z2 direction) from the oil returning hole 23b. A lower end portion of the first returning passage 26a is connected to the second returning passage 26b. In addition, the first returning passage 26a is formed in the vicinity of the outer surface 20 of the cylinder block 2 at the X1 side. The first returning passage 26a is an example of an oil returning passage portion of the present invention.

The second returning passage 26b is formed lower than the oil surface of the oil reservoir portion S. The second returning passage 26b extends linearly from the outer surface 20 of the cylinder block 2 at the X1 side toward the X2 side, and the end portion of the second returning passage 26b at the X2 side is connected to the connection hole 2c. Furthermore, a cap 8 is fitted to the end portion of the second returning passage 26b at the X1 side for inhibiting the oil leakage.

The first returning passage 26a and the second returning passage 26b are able to be formed easily by a linear punching process after the cylinder lock 2 is molded by the molding.

A diameter D1 of the first returning passage 26a and a diameter D2 of the second returning passage 26b include a size with which the oil cannot be sucked up from the oil reservoir portion S towards the oil mist separation portion 22 by the manifold vacuum. Because the manifold vacuum differs by the size and the amount of the intake air of the engine 100, the size of the diameter D1 and the diameter D2 is adjusted so as to correspond to each manifold vacuum of the engine 100.

[The Configuration of a Partition Wall]

Figure 7:
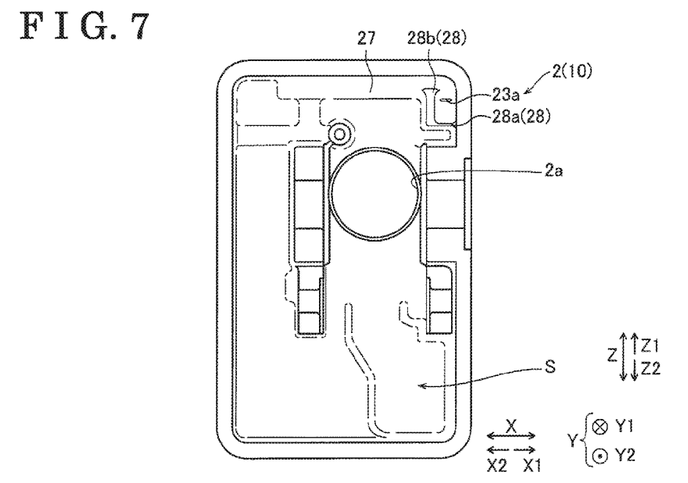
FIG. 7 is a back view illustrating a cylinder block according to the first embodiment of the present invention.

As shown in FIGS. 3 and 7, a partition wall 28 is integrally provided with the engine main body 10 at an inner surface 27 of the cylinder block 2 (the engine main body 10) of the engine main body 10. The partition wall 28 is provided so as to separate the crankshaft 4 and the blow-by gas inlet 23a from each other. In particular, as shown in FIG. 7, the partition wall 28 includes a first partition wall 28a provided at the Z2 side relative to the blow-by gas inlet 23a and extending toward Y2 side relative to a forming position of the blow-by gas inlet 23a, and a second partition wall 28b provided at the X2 side relative to the blow-by gas inlet 23a and extending toward the Y2 side relative to the forming position of the blow-by gas inlet 23a. As a result, the partition wall 28 is formed in an L-shape when seen from Y2 side.

Here, as illustrated in FIG. 3, the oil supplied to the crankshaft 4 rotating in the A direction is scattered as a liquid drop in the Z1 direction and in the Y2 direction by a centrifugal force based on the rotation of the crankshaft 4. However, the oil is inhibited from entering the blow-by gas inlet 23a directly by blocking the oil scattering by the partition wall 28a that extends to the Y2 side relative to the forming position of the blow-by gas inlet 23a. Both of the first partition wall 28a and the second partition wall 28b are integrally formed with the cylinder block 2 when the cylinder block 2 is molded.

The first partition wall 28a is inclined only by an angle (for example, approximately 1 to 2 degrees) downwardly from the Y1 side toward the Y2 side. Accordingly, even in a case where the oil is discharged from the oil mist separation portion 22 to the upper surface of the first partition wall 28a via the blow-by gas inlet 23a, the oil flows on the inclined upper surface of the first partition wall 28a towards the Y2 side, drops from the end portion of the first partition wall 28a at the Y2 side, and is returned to the oil reservoir portion S. Accordingly, the oil may be inhibited from accumulating on the partition wall 28.

[Effects of the First Embodiment]

In the first embodiment, the following effects may be obtained.

In the first embodiment, as described above, because the oil mist separation portion 22 is integrally provided with the engine main body 10 at the outer surface 20 of the engine main body 10, the increase of the number of components and the complication of the manufacturing process when the oil mist separation mechanism M is provided may be inhibited comparing to a case where the oil mist separation portion 22 is separately provided from the engine main body 10.

In the first embodiment, the oil mist separation portion 22 is integrally provided with the engine main body 10 on the upper surface 21 of the outer surface 20 of the engine main body 10. In addition, the oil returning portion 26 includes the first returning passage 26a that includes the upper end portion being connected to the oil returning hole 23b of the oil mist separation portion 22, and that extends downwardly (in the Z2 direction) and linearly from the oil returning hole 23b. Accordingly, because the first returning passage 26a extends downwardly and linearly, the oil separated at the oil mist separation portion 22 may be securely moved downwardly at the first returning passage 26a by its own weight. Accordingly, the oil may be securely returned to the oil stored at the lower portion of the engine main body 10. In addition, because the first returning passage 26a is formed to extend linearly, the first returning passage 26a may be easily formed.

In the first embodiment, the oil mist separation portion 22 is provided with the turning structure including the first passage portion 22a sending the blow-by gas in the Y direction, and the second passage portion 22b connected to the first passage portion 22a via the turning passage portion 22c and sending the blow-by gas in the Y2 direction. Accordingly, the length of the passage sending the blow-by gas may be increased while saving the space of the oil mist separation portion 22. Accordingly, the oil mist separation portion 22 may efficiently separate the oil mist from the blow-by gas while downsizing the oil mist separation portion 22.

In the first embodiment, the oil mist separation portion 22 includes the oil returning hole 23b connected to the oil returning portion 26 and provided in the vicinity of the turning position (the turning passage portion 22c) of the first passage portion 22a and the second passage portion 22b, and the bottom surface portion 23 inclined downwardly towards the oil returning hole 23b. Accordingly, because the oil separated at the oil mist separation portion 22 may be easily collected to the oil returning hole 23b by the bottom surface portion 23 inclined downwardly toward the oil returning hole 23b, the separated oil may be easily returned to the oil via the oil returning portion 26. Because the oil returning hole 23b is provided in the vicinity of the returning position (the turning passage portion 22c), the second passage portion 22b may send the blow-by gas in the Y2 direction that is opposite to the flow of the oil in the Y1 direction toward the oil returning hole 23b. Accordingly, because the oil mist included in the blow-by gas may be easily absorbed by the oil flowing in the opposite direction, the oil mist may be more efficiently separated from the blow-by gas.

In the first embodiment, the sliding direction of the piston 11 is along a horizontal direction (Y direction). The oil mist separation portion 22 includes the blow-by gas inlet 23a opening downwardly. In addition, the partition wall 28 is provided so as to separate the crank shaft 4 and the blow-by gas inlet of the engine main body 10 from each other. Accordingly, the oil supplied to the crankshaft 4 flies upwardly by the centrifugal force by the rotation of the crankshaft 4, and is inhibited from flowing directly to the oil mist separation portion 22 from the blow-by gas inlet 23a opening downwardly by the partition wall 28 separating the crankshaft 4 and the blow-by gas inlet 23a from each other.

In the first embodiment, because the oil returning hole 23b of the oil mist separation portion 22 is provided in the vicinity of the bottom portion of the bottom surface portion of the oil mist separation portion 22, the liquefied oil may be easily collected to the oil returning hole 23b, thereby the oil may be securely returned to the oil.

In the first embodiment, the diameter D1 of the first returning passage 26a and the diameter D2 of the second returning passage 26b are formed to include the size with which the oil cannot be sucked up from the oil reservoir portion S towards the oil mist separation portion 22 by the manifold vacuum. Accordingly, the oil stored in the oil reservoir portion S at the lower portion of the engine main body 10 may be inhibited from returning to the oil mist separation portion 22 via the first returning passage 26a and the second returning passage 26b.

In the first embodiment, because the first passage portion 22a and the second passage portion 22b both include the labyrinth structure, the length of the passage in which the blow-by gas flows may be efficiently increased while saving space of the oil mist separation portion 22.

In the first embodiment, because the engine 100 corresponds to a stationary engine, comparing to an engine mounted on, for example, a vehicle, the mounted state (for example, inclination) of the engine may be inhibited from changing in response to the driving state of the vehicle, and thereby the connection portion 2c between the oil returning portion 26 and the oil reservoir portion S may be inhibited from exposing upwardly relative to the surface of the oil. Accordingly, the engine 100 may be used in a state where the blow-by gas is securely inhibited from entering the oil mist separation portion 22 via the oil returning portion 26.

In the first embodiment, because the oil mist separation portion 22 and the oil returning portion 26 are integrally provided with the engine main body 10, the positioning of the oil returning hole 23b and the oil returning portion 26 (the first returning passage 26a) of the oil mist separation portion 22 does not have to be performed comparing to a case where an oil mist separation portion fixed on a lid is disposed on the cylinder block (in a case of JP2010-159733A). Accordingly, the manufacturing process in which the lid and the cylinder block 5 are fixed to each other may be inhibited from being complicated.

[A Second Embodiment]

Figure 8:
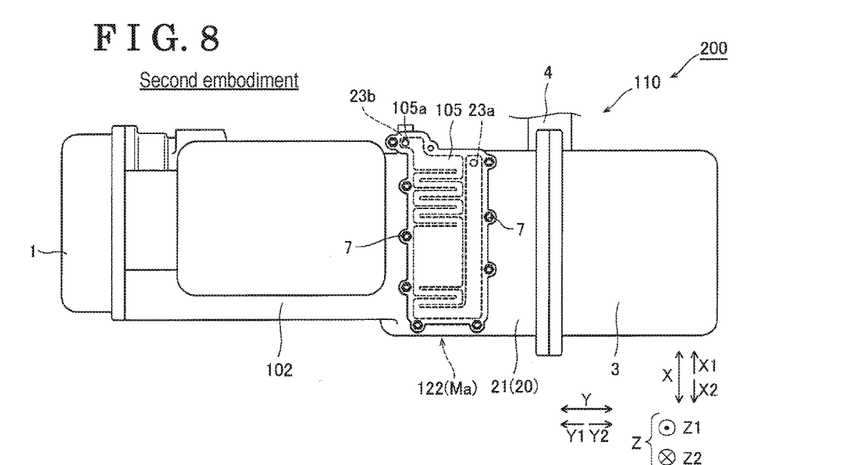
FIG. 8 is a top view of an engine according to a second embodiment of the present invention.

Next, a second embodiment will be explained with reference to FIGS. 6, 8, and 9. In the second embodiment, an example in which a configuration of a blow-by gas passage portion of an oil mist separation portion 122 is different from that of the blow-by gas passage portion of the oil mist separation portion 22 of the first embodiment will be explained. In the figures, the same configuration as that of the first embodiment includes reference numerals that are marked with the same reference numerals as those described in the first embodiment.

An oil mist separation mechanism Ma of an engine 200 according to the second embodiment of the present invention includes the oil mist separation portion 122 and the oil returning portion 26 (see FIG. 6). The oil mist separation portion 122, as shown in FIG. 8, is integrally provided with a cylinder block 102 on the upper surface 21 of the outer surface 20 of the cylinder block 102 of the engine main body 10. The oil mist separation portion 122 is covered with a sheet metal-shaped lid 105 from upward (Z1 side). The engine 200 and an engine main body 110 are examples of an internal combustion engine and an internal combustion engine main body of the present invention, respectively.

[A Configuration of the Oil Mist Separation Portion]

Figure 9:
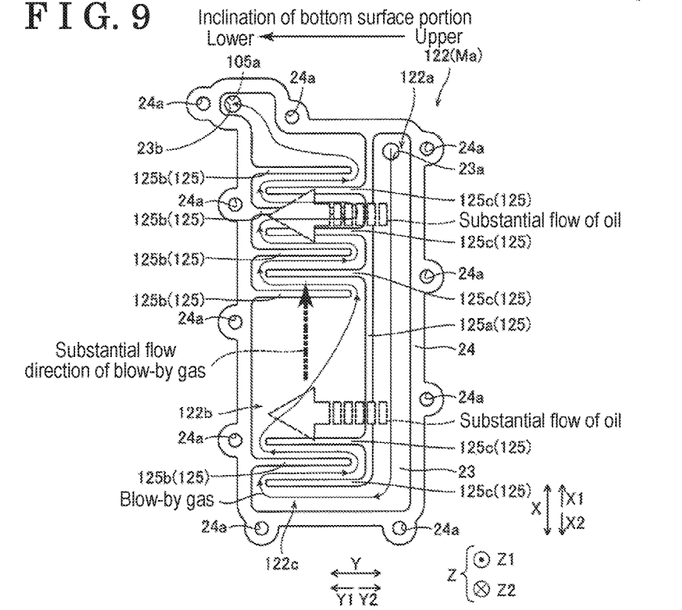
FIG. 9 is a top view illustrating an oil mist separation portion in a state where a lid is removed according to the second embodiment of the present invention.

As shown in FIG. 9, the oil mist separation portion 122 includes the bottom surface portion 23, the outer wall portion 24, and an inner wall portion 125 formed inside the outer wall portion 24. The blow-by gas inlet 23a is provided in the vicinity of the corner portion of the bottom surface portion 23 at the Y2 side and the X1 side. The oil returning hole 23b is provided in the vicinity of the corner portion of the bottom surface portion 23 at the Y1 side and the X1 side.

A blow-by gas outlet 105a passing through (opening upwardly) the lid 105 in the upper and lower direction is provided in the vicinity of the corner portion of the lid 105 at the Y1 side and the X2 side. In addition, the blow-by gas outlet 105a is provided in the vicinity of direct above of the oil returning hole 23b and is connected to a hose (not illustrated).

The inner wall portion 125 includes a first inner wall portion 125a being provided at a position displaced to the Y2 side, and extending from the outer wall portion 24 at the X1 side towards the X2 side. Accordingly, the oil mist separation portion 122 is provided with the turning structure including a first passage portion 122a at the Y2 side relative to the first inner wall portion 125a, a second passage portion 122b at the Y1 side relative to the first inner wall portion 125a, and a turning passage portion 122c at the X2 side. Both of the first passage portion 122a and the second passage portion 122b extend along the X direction at the X1 side relative to the turning passage portion 122c. The turning passage portion 122c extends along the Y direction so as to connect the first passage portion 122a and the second passage portion 122b with each other in the vicinity of the outer wall portion 24 at the X2 side. The first passage portion 122a and the second passage portion 122b are examples of the first blow-by gas passage portion and the second blow-by gas passage portion of the present invention.

The first passage portion 122a linearly extends along X direction. That is, the first passage portion 122a is not formed in the labyrinth structure. The blow-by gas inlet 23a is disposed at one end portion of the first passage portion 122a at the X1 side, and an end portion of the turning passage portion 122c at the Y2 side is connected to the other end portion of the first passage portion 122a at the X2 side.

The inner wall portion 125 includes plural (five) second inner wall portions 125b extending from the outer wall portion 24 at the Y1 side towards the first inner wall portion 125a at the Y2 side, and plural (five) third inner wall portions 125c extending from the first inner wall portion 125a towards the outer wall portion 24 at the Y1 side. The second inner wall portions 125b and the third inner wall portions 125c are disposed alternately in the X direction. As a result, the second passage portion 122b is formed in the labyrinth structure. The oil returning hole 23b and the blow-by gas outlet 105a are disposed at one end portion of the second passage portion 122b which is formed in the labyrinth structure at the X1 side, and the other end portion of the second passage portion 122b at the X2 side is connected to an end portion of the turning passage portion 122c at the Y1 side.

Accordingly, the oil mist separation portion 122 extends serpiginously by the first passage portion 122a, the labyrinth structure of the second passage portion 122b, and the turning structure. Other configurations of the engine 200 according to the second embodiment are the same as those of the aforementioned first embodiment.

[Effects of the Second Embodiment]

In the second embodiment, the following effects may be obtained.

In the second embodiment, because the oil mist separation portion 122 is integrally provided with the engine main body 110 at the outer surface 20 of the engine main body 110, the increase of the number of components, and the complication of the manufacturing process when the oil mist separation mechanism Ma is provided may be inhibited which is the same as the first embodiment.

In the second embodiment, because the blow-by gas outlet 105a is provided in the vicinity of direct above of the oil returning hole 23, the flow of the blow-by gas flowing towards the blow-by gas outlet 105a may be used as a driving force for sending the oil separated at the oil mist separation portion 122 towards the oil returning hole 23*b*. Accordingly, the separated oil may be easily collected to the oil returning hole 23*b*. Other effects of the second embodiment are the same as those of the first embodiment.

[Modified Example]

The embodiments disclosed here should be thought as examples in all respects and be not limited thereto. The scope of the present invention is disclosed by the scope of the claim and is not described by the explanation of the aforementioned embodiment, and includes the scope of the claim and the meaning of the equivalents, and any modification (modified examples) within the scope.

For example, in the first and second embodiments, examples in which the oil mist separation mechanism M(Ma) is used in the stationary engine 100 (200) fixedly mounted are disclosed, however, the present invention is not limited thereto. In the present invention, the oil mist separation mechanism of the present invention may be applied to an internal combustion engine main body of other than the stationary engine. For example, an oil mist separation mechanism of the present invention may be applied to a movable internal combustion engine main body that can be carried when not in use while being fixedly mounted by being placed on a ground when in use. The oil mist separation mechanism of the present invention is especially favorable for the internal combustion engine main body fixedly mounted when at least in use. In addition, the oil mist separation mechanism of the present invention may be applied to an internal combustion engine main body of a vehicle and a vessel that travel.

Examples in which the first passage portion 22*a* and the second passage portion 22*b* are formed in the labyrinth structure in the aforementioned first embodiment, and the second passage portion 122*b* is formed in the labyrinth structure in the aforementioned second embodiment are disclosed, however, the present invention is not limited thereto. In the present convention, neither the first blow-by gas passage portion nor the second blow-by gas passage portion may be formed in the labyrinth structure. The oil mist separation portion of the present invention has only to be integrally provided with the engine main body at the outer surface of the engine main body, and the structure for separating the oil mist from the blow-by gas is not specifically limited.

In the aforementioned first embodiment, an example in which the L-shaped partition wall 28 is disposed is disclosed, however, in the present invention, is not limited thereto. In the present invention, the partition wall has only to separate the crankshaft and the blow-by gas inlet from each other, and does not have to be formed in the L-shape. For example, the partition wall may be formed so as to extend perpendicularly to separate the crankshaft and the blow-by gas inlet from each other.

In the first and second embodiments, an example in which the oil returning portion 26 includes the first returning passage 26*a* extending along the Z direction and the second returning passage 26*b* extending along the X direction is disclosed, however, the present invention is not limited thereto. In the present invention, the oil returning portion may be configured only with the first oil returning passage extending along the Z direction by forming the oil reservoir portion to be positioned directly below the oil returning hole. Accordingly, because the second oil returning passage does not have to be provided, the number of linear drilling process may be reduced.

In addition, in the first and second embodiments, examples in which the oil returning portion 26 is provided at the cylinder block 2 (102) are disclosed, however, the present invention is not limited thereto. In the present invention, the oil returning portion may be configured by a hose that is separately provided from the cylinder block. Accordingly, comparing to a case where the complicated process is required for the integral configuration of the oil returning portion with the cylinder block, because the oil returning portion may be formed only by attaching the hose to the cylinder block, the manufacturing process of the oil mist separation mechanism may be simplified.

In addition, in the aforementioned first and second embodiments, examples in which the oil mist separation portion 22 (122) is integrally provided with the cylinder block 2 (102), however, the present invention is not limited thereto. In the present invention, the oil mist separation portion may be provided at the engine main body other than the cylinder block. For example, the oil mist separation portion may be provided at a cylinder head cover or an oil pan. In a case where the cylinder block is separately provided from the cylinder head, the oil mist separation portion may be provided at the cylinder head.

In addition, in the first and second embodiments, an example in which the first (second) blow-by gas passage portion is formed to extend in the horizontal direction, however, the present invention is not limited thereto. In the present invention, the first (second) blow-by gas passage portion may extend in the upper and lower direction. The first blow-by gas passage portion and the first (second) blow-by gas passage portion may be stacked in the upper and lower direction, and the turning passage portion may be formed to extend in the upper and lower direction so as to connect the first blow-by gas passage portion and the second blow-by gas passage portion.

In the oil mist separation portion 22 (122) of the first and second embodiments, an absorbent absorbing the oil may be disposed on the top surface portion 23. Accordingly, the oil separated from the oil mist may be securely collected. As the absorbent, an absorbing mat, a metal scrubbing brush, and a perforated metal may be used.

EXPLANATION OF REFERENCE NUMERALS 10, 110: engine main body (internal combustion engine main body), 20: outer surface, 21: upper surface, 22, 122: oil mist separation portion, 22*a*, 122*a*: first passage portion (first blow-by gas passage portion), 22*b*, 122*b*: second passage portion (second blow-by gas passage portion), 23*b*: oil returning hole, 26: oil returning portion, 26*a*: first oil returning passage portion (oil returning passage), 100, 200: engine (internal combustion engine main body), M, Ma: oil mist separation mechanism

The invention claimed is:

1. An oil mist separation mechanism of an internal combustion engine, comprising:
   an oil mist separation portion being integrally provided with an internal combustion engine main body at an outer surface thereof, the oil mist separation portion for separating an oil mist included in a blow-by gas sent from the internal combustion engine main body, the oil mist separation portion having a first side, a second side opposite the first side, and a bottom surface portion inclined downwardly toward the second side from the first side; and
   an oil returning portion being connected to the oil mist separation portion, the oil returning portion returning an oil separated by the oil mist separation portion to an oil stored at a lower portion of the internal combustion engine main body, wherein the oil mist separation portion is provided with a turning structure including a first blow-by gas passage portion sending the blow-by gas in a first direction toward the second side from the first side, and a second blow-by gas passage portion being connected to the first blow-by gas passage portion and sending the blow-by gas in a second direction that is opposite to the first direction; and the first blow-by gas passage portion includes an inlet of the blow-by gas disposed at an end portion of an upstream in a flow direction of the blow-by gas, and the second blow-by gas passage portion includes an outlet of the blow-by gas disposed at an end portion of a downstream in the flow direction of the blow-by gas.

2. The oil mist separation mechanism of the internal combustion engine according to claim 1, wherein:

the oil mist separation portion includes an oil returning hole being connected to the oil returning portion and is integrally provided with the internal combustion engine main body at an upper surface of the outer surface of the internal combustion engine main body; and the oil returning portion includes an oil returning passage having an upper end portion that is connected to the oil returning hole, the oil returning passage extending downwardly and linearly from the oil returning hole.

3. The oil mist separation mechanism of the internal combustion engine according to claim 1, wherein:

the oil mist separation portion includes an oil returning hole being connected to the oil returning portion and being provided between the first blow-by gas passage portion and the second blow-by gas passage portion; and the bottom surface portion is inclined downwardly towards the oil returning hole.

4. The oil mist separation mechanism of the internal combustion engine according to claim 1 wherein the internal combustion engine main body is configured such that a sliding direction of a piston is along with a horizontal direction; and the oil mist separation portion includes:

a blow-by gas inlet opening downwardly; and a partition wall being provided so as to separate a crankshaft and the blow-by gas inlet of the internal combustion engine main body from each other.

5. The oil mist separation mechanism of the internal combustion engine according to claim 1, wherein the oil mist separation portion includes an oil returning hole being provided in the bottom surface portion of the oil mist separation portion and being connected to the oil returning portion.

6. The oil mist separation mechanism of the internal combustion engine according to claim 5, wherein the oil returning portion includes an upper end portion that is connected to the oil returning hole and a lower end portion that is soaked in the oil; and the oil returning portion includes a diameter of a passage in which an oil is not sucked up by manifold vacuum.

7. The oil mist separation mechanism of the internal combustion engine according to claim 1, wherein at least one of the first blow-by gas passage portion and the second blow-by gas passage portion includes a labyrinth structure.

8. The oil mist separation mechanism of the internal combustion engine according to claim 1, wherein the internal combustion engine main body is a stationary type or a movable type.

* * * * *